United States Patent [19]

Gonas

[11] Patent Number: 5,700,050
[45] Date of Patent: Dec. 23, 1997

[54] BLOW MOLDED STRUCTURAL INTERIOR AUTOMOTIVE PARTS

[75] Inventor: Albert J. Gonas, Grosse Pointe Shores, Mich.

[73] Assignee: Cambridge Industries, Inc., Madison Heights, Mich.

[21] Appl. No.: 193,012

[22] PCT Filed: Nov. 19, 1993

[86] PCT No.: PCT/US93/11288

§ 371 Date: Apr. 17, 1996

§ 102(e) Date: Apr. 17, 1996

[87] PCT Pub. No.: WO95/13938

PCT Pub. Date: May 26, 1995

[51] Int. Cl.[6] .................. B60R 21/04; B60R 21/045; B60J 5/04; B29C 67/22

[52] U.S. Cl. .................. 296/189; 296/39.1; 296/146.7; 296/70; 296/214; 280/751; 264/515; 264/46.6; 297/219

[58] Field of Search .................. 296/189, 39.1, 296/146.7, 70, 214, 35.2, 39.3, 146.5, 211, 901; 297/219; 280/751; 264/515, 46.6

[56] References Cited

U.S. PATENT DOCUMENTS

| | | | |
|---|---|---|---|
| 3,836,192 | 9/1974 | Wilfert | 296/189 |
| 4,045,076 | 8/1977 | Day, Sr. et al. | 296/39.3 |
| 4,229,036 | 10/1980 | Toda | 296/39.1 X |
| 4,934,736 | 6/1990 | Huisman | 296/70 X |
| 5,040,335 | 8/1991 | Grimes | 296/189 X |
| 5,111,619 | 5/1992 | Billin et al. | 296/39.1 X |
| 5,141,279 | 8/1992 | Weller | 296/189 X |
| 5,171,058 | 12/1992 | Ishikawa | 296/189 |
| 5,328,651 | 7/1994 | Gallagher et al. | 264/46.6 X |

FOREIGN PATENT DOCUMENTS

| 3932121 | 4/1991 | Germany | 296/39.3 |
|---|---|---|---|

*Primary Examiner*—Joseph D. Pape
*Attorney, Agent, or Firm*—Reising, Ethington, Barnard & Perry

[57] ABSTRACT

An energy absorbing interior automotive trim part (36) has a shell (42) made from polypropylene sections (62), (68), and (69) divided via partitions (58) and (72) extending from the outer wall (44) of shell (42) and touching the passenger compartment facing wall (46). The shell (42) is blow molded with carpet (74), vinyls and other fabric materials (76) integrally molded to adhere directly to wall (46). After molding, interior section or partial section (62) is filled with a structurally engineered energy absorbing foam (64) to provide an energy absorbing structure which will compress a pre-determined distance while absorbing the compressive force applied.

16 Claims, 3 Drawing Sheets

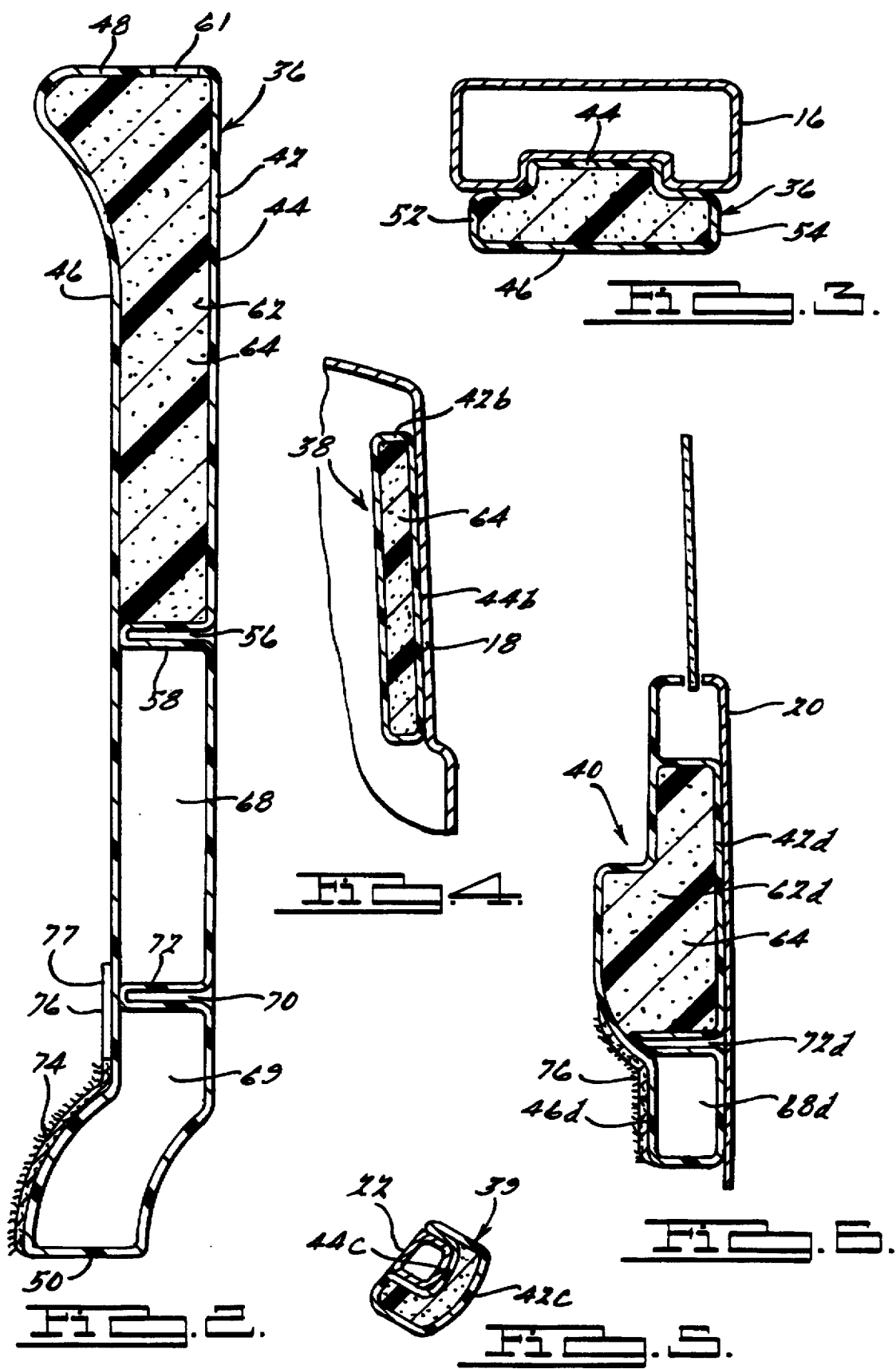

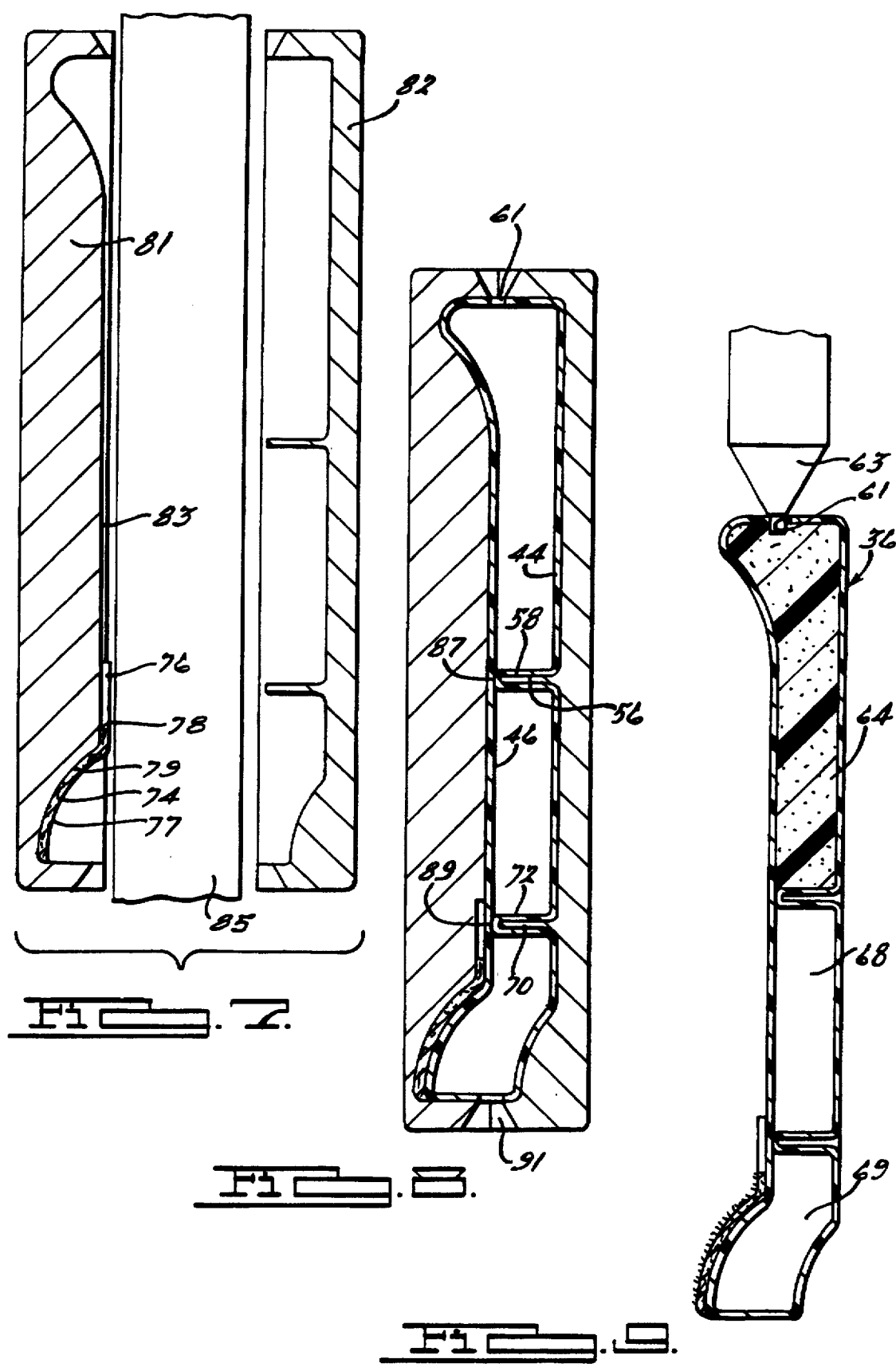

BLOW MOLDED STRUCTURAL INTERIOR AUTOMOTIVE PARTS

TECHNICAL FIELD

The field of this invention relates to an impact energy absorbing safety automotive trim parts for an automotive interior and a method of manufacture of the safety automotive trim parts.

BACKGROUND OF THE DISCLOSURE

Automotive safety has been a major concern in the automotive industry for a number of years. Many safety features have been developed to reduce the jarring impact on passengers by making impact absorbing exterior parts such as energy absorbing bumpers, crushable impact zones where the sheet metal bends and absorbs energy, and collapsible steering columns that prevent the steering column from further intrusion into the passenger compartment upon impact. Devices such as seat belts have been developed to limit the motion of occupants within the vehicle. Energy absorbing air bags have been developed to be employed upon impact to prevent the occupants from hitting the windshield and to supplement the seat belts to restrain the motion of the occupants in the forward direction.

Certain efforts have been made to lessen the extent of injury of the occupant upon impact with an interior part of the automotive vehicle. Padded instrument panels have been developed for this purpose. These instrument panels have been developed to be formed by injection molding such that a cosmetic visible skin is backed by a light foam core.

Other plastic interior trim parts have been commonly used in the automotive industry. New materials and improved molding techniques have made it possible and economically desirable that the interior trim for A-pillars, B-pillars, floor trim pieces and inside door panels are made from plastics. Often these plastics are covered via adhesives with a cloth fabric, carpeting, or embellished with an applique or an embossment. The use of plastic interior trim parts results in an attractive passenger compartment. Besides the economic advantage of plastics over other metal interior trim parts, the use of plastics provides sound insulation qualities and weight savings that provide a quieter ride and better fuel economy respectively.

Even with all the above mentioned safety features placed within an automotive vehicle within the past three decades, there is an impetus to further decrease injuries resulting from automotive vehicular collisions. Further efforts and future additional governmental regulations continue to improve the safety levels of automotive vehicles. A reduction of the injuries that are a result of the occupant impacting against the interior of the passenger compartment is desired. Many injuries are due to occupants failure to use available seat and lap belt restraints, and this has resulted in vast efforts to develop passive restraints such as air bags and automatic lap belt mechanisms. However passive and automatic mechanisms are expensive and add to the complexity and weight of the vehicle. Even with these passive and automatic restraints, it is desired to further decrease the probability of an occupant under various conditions, to impact his head, shoulders, arms, and legs against an interior automotive trim part, or worse yet shatter the plastic trim part and impact against the inner facing surface of the exterior structural steel. Furthermore, it is undesirable to have shattered trim parts presenting any sharp cutting edge which may result in cuts and lacerations. Any jarring impact against the structural steel and the. lacerations and cuts caused by the shattered plastic interior trim part is of course undesirable.

Previous attempts to expeditiously reduce injuries caused by the impact of the occupant within the passenger compartment against the side pillars, door panels and other trim have encountered difficulties. The difficulties in producing safety trim are several. Firstly, the material used in making automotive trim components must be strong enough to retain its shape. Often pull handles and arm rests are integrally formed within door panels so that the material must be strong enough to resist pushing and pulling forces normally encountered during normal use of the vehicle. Many of the parts are relatively large such that the plastic needs to be reinforced to make it stiff enough to span the required distance while maintaining its structural integrity. One common way to stiffen the plastic material is to reinforce it with glass fibers. However the glass fibers also make the component brittle and prone to shatter upon sufficient force exerted on it, the kind of force encountered during a collision. For safety purposes, a pliable flexible blow molded plastic is desirable.

Secondly, the space constraints pose a problem. Automotive manufacturers are attempting to provide as much space available within the passenger compartment while minimizing the weight and space of the exterior dimensions of the automotive vehicle. Previous structural interior trim components can be padded at an occupant facing surface thereof and or layered with carpeting. The layers of structural components, padding and carpeting take up valuable room away from the passenger compartment. As a result, the vehicle must be made larger to obtain the desired sized passenger interior compartment or the passenger compartment is smaller than desired.

What is needed a structural interior trim component that provides a measure of safety against impact while being resistant to shattering or fracturing during impact while being strong enough for its normal use and able to save space as compared to known structural interior trim parts and a method of making the same.

SUMMARY OF THE DISCLOSURE

In accordance with one aspect of the invention, a safety molding for an interior trim piece of an automotive vehicle includes a blow molded shell of resilient plastic material shaped to have an exterior facing section thereof abuttable against a surface of an exterior body of said automotive vehicle that faces the passenger compartment within the automotive vehicle. The blow molded shell has a first interior section that is filled with an engineered plastic foam that is normally self supportive under forces encountered during normal use of the vehicle but is energy absorbing under a compressive force over a predetermined amount that can be encountered during impact collision.

The blow molded shell may have partitions which allow some interior sections to be foam filled and others not foam filled. Preferably, the shell has a second interior section separated from said first interior section by a partition formed in said shell. The second interior section is hollow and free from said rigid foam that fills the first interior section. The second interior section is in a position not encountered by impact with the occupant. The partition is formed by a recessed groove within a shell wall that is abuttable against the surface of the exterior body of the automotive vehicle. An opposing wall of the shell is abuttable against the wall forming the groove. The opposing wall conceals the groove from a viewpoint from within the passenger compartment.

Desirably, the safety molding has its opposing wall i.e. the wall facing the interior passenger compartment integrally molded with a cosmetic layer of fabric, vinyl, or other cosmetic material.

The safety trim piece can be formed in a variety of pieces and applied throughout the interior of the automotive passenger compartment. In one application, the shell is formed in the shape of an A-pillar and vertically disposed at the side of a front windshield of said automotive vehicle. In another embodiment, the shell is formed in the shape of an B-pillar and vertically disposed at the rear edge of the opening in the automotive vehicle for the front door. In another embodiment, the shell is formed in the shape of a rear quarter sail panel and vertically disposed at the side of the rear seats and interposed between the rear window and side window of the automotive vehicle. In yet another embodiment, the shell is formed in the shape of a knee brace and positioned under an air bag container within the instrument panel. The shell can also be formed in the shape of an door panel and vertically disposed at the side of an interior facing surface of an automotive door component. In convertible models, the shell can formed in the shape of an garnish molding for the header of a windshield and horizontally disposed along a top edge of a front windshield. Other interior structural trim parts can also be made in accordance with the teachings of this disclosure including but not limited to head liners, top portions of seat backs, C-pillars and cargo panels.

According to another aspect of the invention, a method for taking the safety structural interior trim piece of an automotive vehicle includes the steps of blow molding a resin parison within a cavity of a mold into a shell of resilient plastic material having the form of the structural interior trim piece and having a hollow first core therein; removing the shell from the mold; filling the hollow first core within the shell with a structural plastic foam; and curing the foam such that it is resistant to compressive and shear forces under a predetermined amount in order to provide structural strength to said structural trim piece and provide compressibility of said shell and foam when a compressive force above said predetermined amount is exerted on said structural trim piece.

Desirably, the method also includes the mold being shaped to form a blow molded shell having a first and second core separated by a partition formed in a wall of said shell and in contact with an opposing wall of said shell. The second core remains hollow after said first core is filled with said structural engineered foam.

Where its desirable, a fabric is integrally molded with the shell. The fabric is arranged with the blow molding cavity such that a rear surface thereof faces the resin parison and a front surface faces away from the parison such that upon blow molding, the resin parison within said cavity of said mold the shell is formed of resilient plastic material integrally molded and bonded directly to said rear surface of the fabric. In one embodiment, the fabric is bonded to the opposing wall of said shell. The fabric may take the form of a carpet, decorative vinyl covering, cloth, or other cosmetic covering.

BRIEF DESCRIPTION OF THE DRAWINGS

Reference now is made to the accompanying drawings in which:

FIG. 2 is a cross sectional view of a B-pillar taken along lines 2—2 shown in FIG. 1;

FIG. 3 is a cross-sectional view taken along lines 3—3 shown in FIG. 2;

FIG. 4 is a cross-sectional view of a rear quarter panel taken along lines 4—4 shown in FIG. 1;

FIG. 5 is a cross sectional view of a windshield garnish molding taken along lines 5—5 shown in FIG. 1;

FIG. 6 is a cross section view of a door panel taken along lines 6—6 shown in FIG. 1;

FIG. 7 is a view showing textile material arranged within a blow molding cavity and receiving a parison;

FIG. 8 is a view similar to FIG. 7 showing closure of the mold and blowing the parison against the textile material and mold walls; and FIG. 9 illustrates the filling of a first core within the blow molded shell with structural foam material.

DETAILED DESCRIPTION OF THE PREFERRED EMBODIMENT

Figure 1:
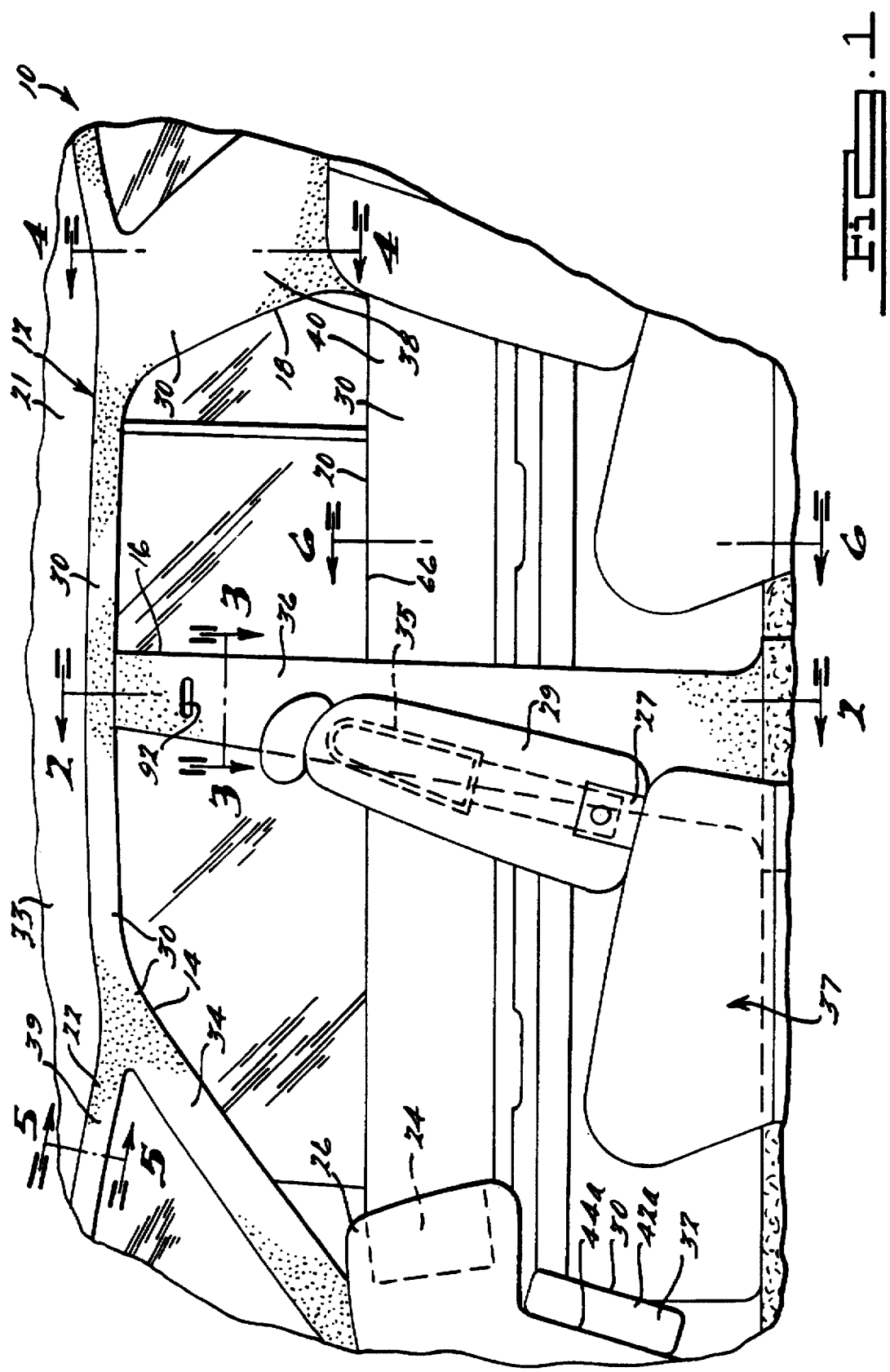
FIG. 1 is a fragmentary perspective view of a passenger compartment of an automotive vehicle incorporating structural interior trim parts in accordance with the invention.

Referring now to FIG. 1, an automotive vehicle 10 has a passenger compartment 12. The structural exterior of the automotive vehicle has various parts that surround and form a cage about the passenger compartment 12. Some of these parts are commonly referred to as the A-pillar 14, B-pillar 16, rear quarter sail 18, door panel 20, roof panel 21, and wind-shield header 22.

Within the passenger compartment are various structural interior trim parts generally referred to as 30 that cover and conceal the exterior parts 14, 16, 18, 20, 21, and 22 from within the passenger compartment 12. The use of structural interior trim parts 30 are used for cosmetic purposes as well as sound insulation. More specifically, the structural interior trim parts 30 may take various shapes and be secured about various parts of the passenger compartment 12. For example knee bolster 32 may be installed under the air bag assembly 24 within instrument panel 26. Part 34 may be installed along the A-pillar 14. Part 36 may be installed along. B-pillar 16. Part 38 may be installed at the rear quarter sail 18. Part 39 may be installed along windshield header 22 which has particularly applicability in convertible models. Interior door panel 40 may be installed within door panel 20. Each of these structural parts will have specific dimensions and shapes but all have common features as generically described for the structural trim parts 30. Other interior trim parts such as head liner 33 and upper seat back portion 35 may also be made in accordance with the teachings described below.

Referring now to FIGS. 2 and 3, the B-pillar part 36 is illustrated in more detail. The part 36 includes a shell 42 blow molded from poly-propylene. The shell may have a wall thickness of approximately 60/1000 inches. The part has an exterior facing wall 44 that conforms to automotive body-in-white and remaining walls 46, 48, 50, 52 and 54 that conform to a desired shape. The exterior facing wall 44 may have a groove 56 therein that form partition 58. Wall 48 has an opening 61 therein that allows the interior first section 62 to be filled with a structurally engineered foam 64. Interior section 62 is to be positioned above the DLO or daylight opening level 66 of the automotive passenger compartment 12 where impact with an occupant is possible during a collision. A second groove 70 forms a structural partition 72 to provide additional structure along interior sections 68 and 69. These sections 68 and 69 remain hollow and are sealed from access to the foam 64 within section 62 by partition 58. The wall 46 can be formed flat or contoured and can conceal the grooves 56 and 70 from the viewpoint from within the passenger. compartment 12.

A lower section of passenger compartment facing wall 46 may have a carpet 74 and other type of fabric covering 76 directly bonded thereto. Preferably the coverings 74 and 76 are integrally molded with the shell 42 directly adhering and integrating itself with the backing or back surface 77 of the carpeting 74 or fabric 76 respectively.

Reference is now made to FIGS. 7, 8 and 9 which illustrate one way that the part may be manufactured. A blow molding cavity is formed by a pair of mold parts 81 and 82 shown in the open position in FIG. 7 and in the closed position in FIG. 8. Mold part 81 has a contour provided by inside surface 83 that provides the desired contour of wall 46 and parts of walls 48, 50, 52 and 54. Mold part 82 has several upstanding areas 86 and 88 that form the grooves 58 and 70.

A piece of carpet 74 and fabric 76 may be sewn together along seam 78 and positioned in mold 81 such that its front surface 79 abuts contoured surface 83. A poly-propylene resin parison 85 also interposed between the two mold parts 81 and 82. Fabric is defined in a generic sense to be any surface decorated trim, for example but not limited to a vinyl covering, a textile, simulated wood grain plastic trims or paint films. Backing of all fabric would have a coating to withstand the molding cycle without discoloration or crushing of the fabric pile in the case of carpeting.

When the molds parts 81 and 82 are closed as shown in FIG. 2, and the parison 85 is blown within the mold cavity through openings 61 and 91, the parison, is pressed against and bonds to the back surface 77. Furthermore the wall 46 is bonded to the wall 44 in sections 87 and 89 opposing grooves 58 and 70 to form partitions 58 and 72. The blow molding pressure which is typically a nominal 100 psi and perhaps as low as 80–85 psi, is enough to force the carpet 74 and fabric 76 and the poly-propylene resin parison 85 against the contoured surface 83. The materials 76 and 74 are properly chosen so that they can be stretchable in two direction so that they can deform considerably from a plane to accommodate a wide variety of contours 13. Parison 85 is also stretchable and deformable, in its plasticized and blow moldable state, so that it can conform to the interior of molded parts 81 and 82 upon exertion of approximately 80 psi. The parison 85 can be pigmented to be a desired color and surface 83 may be embossed to form a textured pattern on wall 46.

After the part 36 is removed from the mold cavity as shown in FIG. 9, a nozzle 63 may enter the opening 61. The nozzle provides the shell interior section 62 with a structural plastic foam 64. The nozzle is loosely fitted within opening 61 to allow air to escape as the foam 64 fills the interior section 62. After the foam 64 fills the section 62, it is left to cure. Upon curing the foam is structurally engineered to be substantially self supportive below a certain predetermined compressive force and becomes compressible above the predetermined force to absorb energy. Such predetermined force is set between what is normally encountered during everyday usage of the automotive vehicle and what an impact during collision condition produces. Such family of structurally engineered foams, is commercially available from various sources such as Dow or BASF or such other chemical companies. The specific foam may vary depending on various factors such as the specific trim part 30 to which the foam is applied, and the size and type of automotive vehicle. The shell thickness also may be varied depending on the thickness of the interior foam, the position of the part in the vehicle, the structure of the part, and the size and type of automotive vehicle in which the trim part is installed. It is foreseen that with thicker foam interiors, the shell wall thickness can be reduced.

The part 36 may be provided with an access port 92 for the insertion therethrough for a seat belt (not shown). The port 92 may be cut into the part 36 and provided with a sleeve (not shown) fitted in port 92 or molded therein during the molding process.

The use of structurally engineered foam 64 within the shell and the use of structural supporting partitions 58 and 72 allow the shell wall 46 to be thinner than similar plastic parts found in the prior art with similar design criteria. The thinner wall allows more flexibility of wall 46 upon impact forces which allow the wall 46 to flex as the foam 64 also compresses and absorbs energy. This reduces the risk of the plastic shell 42 shattering and hence reduces the risk of injury due to any such shattered plastic.

Each of the parts 32, 34, 36, 38 and 40 may be constructed by the same method and in the same fashion as the part 46. The knee bolster 32 as shown in FIGS. 1 may have its shell 42a entirely filled with foam 64 and anchored under instrument panel 26 against its front wall 44a.

Rear quarter sail part 38 as shown in FIGS. 1 and 4 may have its shell 42b completely filled with foam 64 and has its outer wall 44b abutting the rear quarter sail exterior steel panel 18 of the automotive vehicle.

Windshield header part 39 as shown in FIGS. 1 and 5 may have its shell 42c completely filled with foam 64 and has its exterior wall 44c abut the wind-shield header 22.

Interior door panel 40 as shown in FIGS. 1 and 6 may have its shell 42d partially filled with foam 64 within section 62d and has lower section 68d remaining hollow. Structural partition 72d may also act as the divider for retaining the foam within section 62d and from section 68d. The lower section of wall 46d may be integrally formed and bonded with fabric material 76. Seat back portion 35 may form part of the structural frame 27 of a seat back and be within the seat 37 embedded within the seating cushion and cover assembly 29.

Each of the above described trim parts 30 may have appropriate snap fit fasteners 94 welded to the exterior wall 44 or molded internally in the mold for attachment to the shell to provide appropriate mounting of the shell within the passenger compartment. Alternately, flanges (not shown) may be incorporated in the shell to receive fasteners therethrough.

The use of compatible foam such as polyurethane with a compatible shell of polyurethane provides that the foam adheres by chemical bond together which provides integrity during collision impact forces exerted thereon.

The above described parts are illustrative of the application of the interior trim part 30 formed with the above described method and provided impact energy absorption through the use of structurally rigid foam filling 64 placed within a thin flexible shell that is shatter resistant during flexing upon impact forces of the nature and magnitude endured during collisions of automotive vehicles.

Variations and modifications are possible without departing from the scope and spirit of the present invention as defined by the appended claims.

The embodiments in which an exclusive property or privilege is claimed are defined as follows:

1. A safety molding for an interior trim piece of an automotive vehicle, said safety molding characterized by:
   a blow molded shell of resilient plastic material shaped to have an exterior facing section thereof abuttable against a passenger compartment facing surface of a exterior body of said automotive vehicle;

said blow molded shell having a first interior section that is filled with a structurally engineered foam that is normally rigid to be resistant and with-stand compressive forces under a predetermined amount to provide structural strength to said molding but is compressible under a compressive force over said predetermined amount.

2. A safety molding as defined in claim 1 further characterized by:

said shell having a second interior section separated from said first interior section by a partition formed in said shell; and said second interior section being hollow and free from said structurally engineered foam filling said first interior section; said first and second interior sections both partially defined by a unitary passenger compartment facing wall of said shell.

3. A safety molding as defined in claim 2 further characterized by:

said partition being a groove within said shell that is formed in said section that is abuttable against said surface of said exterior body of said automotive vehicle, an opposing surface of said shell being abuttable against said section forming said groove, said opposing surface concealing said groove from a viewpoint from within said passenger compartment.

4. A safety molding as defined in claim 3 further characterized by:

the exterior of said shell of said opposing surface having a cosmetic layer of material integrally molded thereon during the blow molding of said shell.

5. A safety molding as defined in claim 3 further characterized by:

said shell being formed in the shape of an A-pillar and vertically disposed at the side of a front windshield of said automotive vehicle.

6. A safety molding as defined in claim 3 further characterized by:

said shell being formed in the shape of an B-pillar and vertically disposed at the rear edge of the opening in the automotive vehicle for the front door.

7. A safety molding as defined in claim 3 further characterized by:

said shell being formed in the shape of an rear quarter sail panel and vertically disposed at the side of the rear seats and interposed between the rear window and side window of said automotive vehicle.

8. A safety molding as defined in claim 3 further characterized by:

said shell being formed in the shape of an knee bolster and positioned under an air bag container within said instrument panel.

9. A safety molding as defined in claim 3 further characterized by:

said shell being formed in the shape of a door panel and vertically disposed at the side of an interior facing surface of a automotive door component.

10. A safety molding as defined in claim 3 further characterized by:

said shell being formed in the shape of an garnish molding for the header of a windshield in a convertible model and horizontally disposed along a top edge of a front windshield of said automotive vehicle.

11. A safety molding as defined in claim 3 further characterized by:

said shell being formed in the shape of a seat back insert and positioned at a seat back position within a passenger vehicle seat.

12. A method of making a safety molding for a structural interior trim piece of an automotive vehicle, said method characterized by:

blow molding a resin parison within a cavity of a mold into a shell of resilient plastic material having the form of said structural interior trim piece and having a hollow first interior section therein;

removing said shell from said mold;

filling said hollow first hollow interior section within said shell with a structural plastic foam and curing said foam such that it is resistant to compressive forces under a predetermined amount in order to provide structural strength to said structural trim piece and provide compressibility of said shell and foam when a compressive force above said predetermined amount is exerted on said structural trim piece.

13. A method as defined in claim 12 further characterized by;

said mold being shaped to form a blow molded shell having a first and second interior sections separated by a partition formed in a wall of said shell and in contact with an opposing wall of said shell, said first and second interior sections being defined in part by said opposing wall of said shell;

said second interior section remaining hollow after said first interior section is filled with said structural plastic foam.

14. A method as defined in claim 13 further characterized by:

arranging a piece of fabric within said blow molding cavity such that a rear surface thereof faces said resin parison and a front surface faces away from said parison such that upon blow molding said resin parison within said cavity of said mold said shell is formed of resilient plastic material integrally molded and bonded directly to said rear surface of said fabric.

15. A method as defined in claim 12 further characterized by:

said fabric being bonded to said opposing wall of said shell.

16. A method as defined in claim 12 further characterized by:

arranging a piece of fabric within said blow molding cavity such that a rear surface thereof faces said resin parison and a front surface faces away from said parison;

blow molding said resin parison within said cavity of said mold to integrally mold said shell of resilient plastic material and bond directly to said rear surface of said fabric.

* * * * *